United States Patent [19]

Reimers

[11] Patent Number: 4,598,314

[45] Date of Patent: Jul. 1, 1986

[54] METHOD AND APPARATUS FOR CONVERTING A VIDEO SIGNAL TO A CORRESPONDING SIGNAL OF LOWER LINE COUNT

[75] Inventor: Ulrich Reimers, Ober-Ramstadt, Fed. Rep. of Germany

[73] Assignee: Robert Bosch GmbH, Stuttgart, Fed. Rep. of Germany

[21] Appl. No.: 576,613

[22] Filed: Feb. 3, 1984

[30] Foreign Application Priority Data

Feb. 7, 1983 [DE] Fed. Rep. of Germany ....... 3304030

[51] Int. Cl.$^4$ .............................. H04N 7/01
[52] U.S. Cl. ..................... 358/140; 358/141
[58] Field of Search ................... 358/11, 12, 140, 141, 358/160

[56] References Cited

U.S. PATENT DOCUMENTS 4,471,381  9/1984  Kasuga et al. ................ 358/140
4,496,974  1/1985  Heitmann ...................... 358/140

*Primary Examiner*—James J. Groody
*Assistant Examiner*—Michael D. Parker

*Attorney, Agent, or Firm*—Frishauf, Holtz, Goodman & Woodward

[57] ABSTRACT

A switch (7) changes its position field by field so that the first field of each frame of digitized video signals may be processed differently from the second field. One field may be furnished directly to the switch and the other one through a line interpolator. In another embodiment, one field is subjected to a simpler line interpolator and the other to a line interpolator using two stages of one line delay. The line interpolators preserve some of the quality of the higher line count signal produced by a high definition camera. The signals passing through the switch (7) are distributed line by line alternately to storage units (M1) and (M2), where they are written in at a sampling rate determined in accordance with the invention. They are read out at a lower sampling rate field by field alternately from the two storage means, so that one field is read out while two fields are written in, each with the desired lower line count and desired line length to avoid geometrical distortion. The relation of the first sampling rate to the various line data is determined by a formula in accordance with the invention, so as to avoid distortion of picture geometry.

8 Claims, 2 Drawing Figures

METHOD AND APPARATUS FOR CONVERTING A VIDEO SIGNAL TO A CORRESPONDING SIGNAL OF LOWER LINE COUNT The invention concerns conversion of a video signal for reducing the line count to about half of the original number of lines per frame while maintaining the same picture field frequency and interlace ratio. In particular, the invention concerns such a conversion in which the video signal is first digitalized, transmitted field by field, and stored line by line, and then read out of storage in a manner corresponding to the second and lower line count.

In changing the line count of a video signal from a line count of the order of twice the usual video transmission standard line count to a signal having such a standard line count such as, for example, 625 or 525 lines, while maintaining the field sequence frequency and interlace ratio, substantial problems are involved, particularly in maintaining the standard vertical blanking interval and the obtaining of an undistorted picture geometry. Since the number of lines in the vertical blanking interval of the high-line-count-system ought not to be substantially greater than in the standard signal (e.g. 25 per field), in a simple downwards conversion in the ratio of, for example, 2:1, geometry distortions occur because in the converted signal the same picture height is represented by relatively fewer lines. In a 1,249 line system having a vertical blanking interval of 25 lines per field, there are provided 1,199 active lines, but in a 625 line system only 575 active lines, which signifies a reduction of the line count by about 4% compared to the high line count system. In consequence, the picture height will appear too great by 4%.

In order to prevent this error from appearing as a distortion, a corresponding format change must also be introduced in the horizontal direction. Instead of the normal blanking interval of about 16.7% of the entire interval between the ends of successive television lines, this blanking interval must be increased to about 18.8%.

SUMMARY OF THE INVENTION

It is an object of the present invention to provide a method and apparatus for converting a high line count video signal into a video signal with a line count, according to the contemporary television signal, without producing visible distortions of picture geometry.

Briefly, the digitizing sample frequency $f_{sI}$ at which the video signal with the high line count I is digitized is derived from the active pixel count per line for the video signal with the lower line count II as follows:

$$f_{sI} = \frac{N}{\tau H \, actI \cdot \frac{nz_{actII}}{nz_I - nz_{AVI}} \cdot M}$$

wherein:

$f_{sI}$ = video signal sampling rate used to digitize
$\tau H \, actI$ = active line duration
$nz_I$ = number of lines
$na_{AVI}$ = number of lines in the vertical blanking interval for the video signal with the higher line count (I)
$N$ = number of active sample values per line
$nz_{actII}$ = number of active lines for the video signal with the lower line count
$M$ = conversion factor for reducing the number of lines.

The invention has the advantage that a standard television signal is produced having a few of the inherent quality advantages of the high line count signal. There is the further advantage that no storage of a frame for a frame interval is necessary for the line count conversion and signals can be read out of the storage units used, beginning practically with the storage of the first line of a field.

This converted video signal can, for example, be derived from a picture signal generator such as a high definition television camera in order to feed, for example, the finder monitor in the camera head or other picture reproduction apparatus operating according to the conventional television standard.

In a first embodiment of the invention, the first field of the frame has its lines written alternately into two stores, from one of which reading out at the half rate begins practically at once, and the second fields of each frame are subjected to line interpolation before being similarly distributed to the same two stores, while the reading out of one of them, already begun, continues and the reading out of the other begins at the longer line interval rate.

In a second embodiment, both fields are subjected to line interpolation and preferably in the line interpolation of the second field, at least two cascaded lines, each of one television line delay interval, are used, and signals from an odd number of locations spaced successively from an odd number of locations involving successive delays of one television line are combined to provide the interpolated signal.

Further details of the invention appear in the more detailed description given below.

BRIEF DESCRIPTION OF THE DRAWINGS

The invention is further described by way of example with reference to the annexed drawings, in which.

DESCRIPTION OF THE ILLUSTRATED EMBODIMENT

Figure 1:
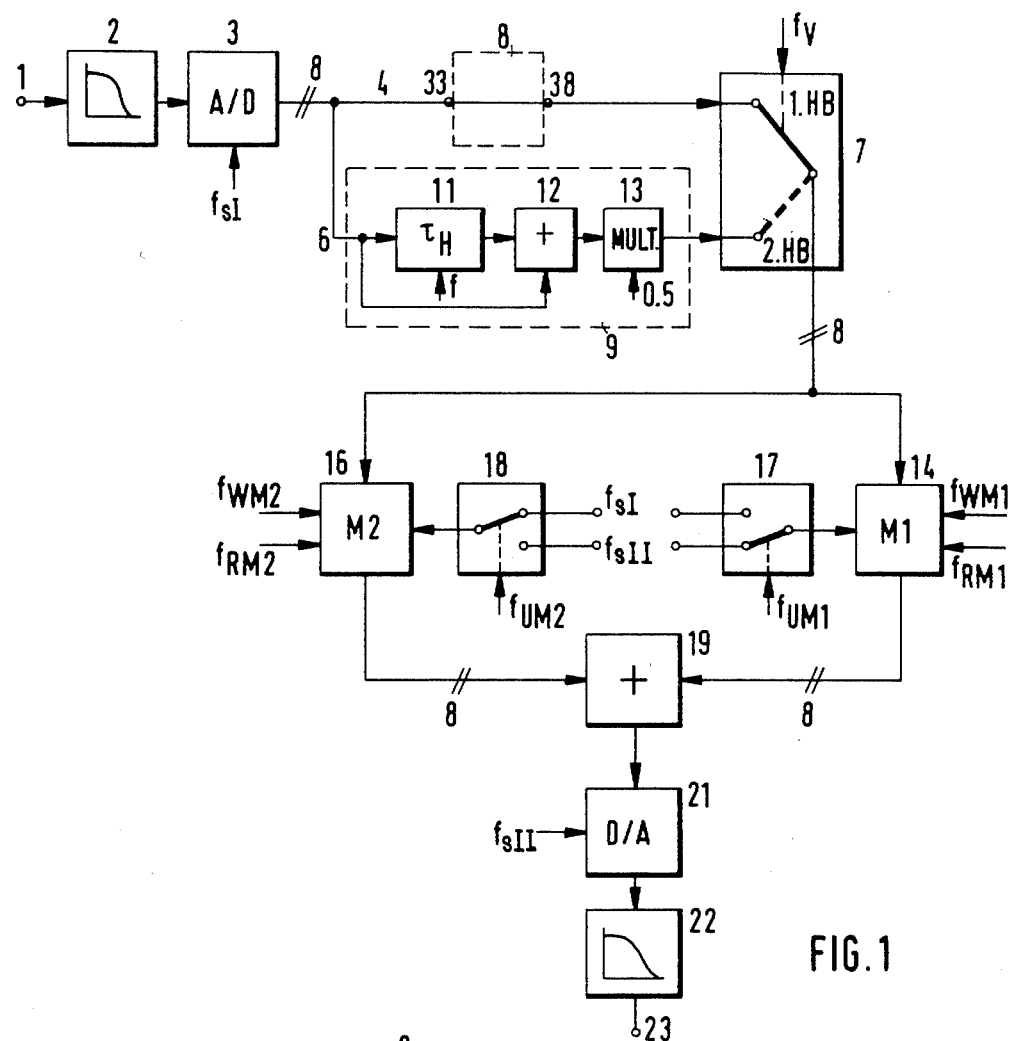
FIG. 1 is a circuit block diagram of apparatus for carrying out the method of the invention.

At the input terminal 1 of FIG. 1, an analog video signal is provided that has a line count per full picture that is approximately twice that of the standard commonly used at present. This video signal may be produced, for example, by a high definition television camera.

The input television signal is then supplied, through a low-pass filter 2 to an analog-to-digital converter 3, in which it is converted into a digital video signal, for example a video signal in the form of a sequence of 8-bit sample values. The A/D converter 3 is clocked at a sampling frequency $f_{sI}$ of about 28.6 MHz, corresponding to the high line count. At the output of the A/D converter 3 are provided two branches 4 and 6 respectively for the transmission of the first and second fields of each television frame.

Figure 2:
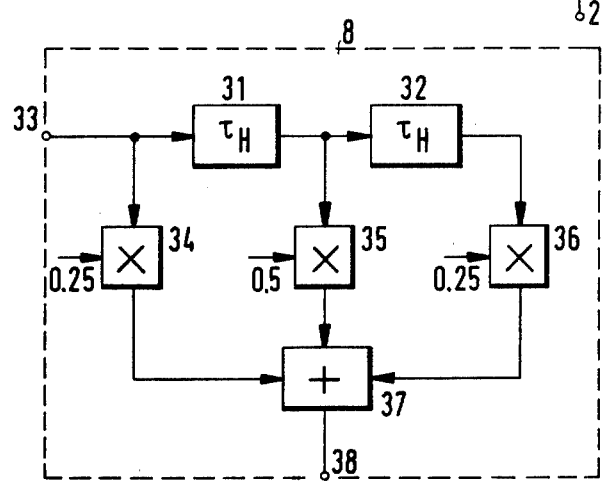
FIG. 2 is a circuit block diagram of an interpolation circuit for the video signal of high line count.

In the simplest case, the first field can be supplied directly to one connection of a field switch 7, or else, with some advantage, for reduction of alias structures, first through an interpolation circuit 8 indicated in broken lines in FIG. 1 and illustrated in detail in FIG. 2.

The second field is supplied through a line interpolation circuit 9 to the other connection of the field switch 7. The field switch 7 is switched over field-by-field with vertical scan frequency pulses $f_V$.

The line interpolation circuit 9 consists, in one possible embodiment, of a delay line 11, which delays the incoming video signal by one television line period $\tau_H$. At one input of an addition stage 12 is connected the output of the delay line 11, and the other input of the addition stage 12 is connected to the undelayed video signal. The addition circuit 12 accordingly adds the signals of two successive lines. The output of the addition stage 12 is connected to a multiplier stage 13, to another input of which there is supplied a coefficient (0.5) for multiplication of the video signal.

The alternating selector switch 7 operates field-by-field so that at its output there are made available all the lines of the first field and—because of the line interpolation-averages of the lines of the second field. These signals are then deposited in two line stores 14 and 16 which are correspondingly controlled for storage of the line signals.

Write-in pulses $f_{WM1}$ and $f_{WM2}$ are respectively provided for the stores 14 and 16. The corresponding clock rate $f_{sI}$ is applied to one or the other of the stores 14 or 16. For reading-out of the signals, the stores 14 and 16 are respectively unlocked by the read-out pulses $f_{RM1}$ or $f_{RM2}$ and are read out with the clock pulses $f_{sII}$(13.5 MHz) supplied by the switch 17 or the switch 18. The switches 17 and 18 are actuated by the switchover pulses $f_{UM1}$ and $f_{UM2}$. When the further line interpolation circuit 8 is lacking, only the odd numbered lines are alternately written into the stores 14 and 16 for the transmission of the first field (whereas the even numbered lines are not picked up) by a corresponding storage unit control. If, for example, the first line of the first field is stored in the store 14, the second line is suppressed by the blocking of the store 16 and then the third line is written into the store 16 with the clock rate $f_{sI}$, while at the same time the first line is read out of the store 14 with the clock rate $f_{sII}$. After storage of the third line in the store 16, the delivered fourth line is suppressed, the fifth line is written into the store 14 and at the same time the third line is read out of the store 16. The lines for the first field of the desired line count, having a corresponding converted line duration, are then made available in alternation at the outputs of the stores 14 and 16.

For the transmission of the second field, the entire collection of line signals delivered by the switch 7 are written into the stores 14 and 16 and read out in accordance with the new clock rate $f_{sII}$. There accordingly appear alternately at the outputs of the stores 14 and 16 the lines of the second field (produced by interpolation of two neighboring lines) with the desired line count and with a converted line duration. The outputs of the respective stores 14 and 16 are connected in each case to one input of an addition stage 19, from the output of which a digital video signal of the desired standard is made available. This means that the sample output rate has been made to fit the standard of the digital studio in accordance with the equation:

$$f_{sI} = \frac{N}{\tau_{H\,actI} \cdot \frac{nz_{actII}}{nz_I - nz_{AVI}} \cdot M}$$

in which:
$f_{sI}$ = sampling frequency
$\tau_{H\,actI}$ = active line duration
$nz_I$ = number of lines
$nz_{AVI}$ = number of lines of the vertical blanking interval for the video signal with the line count I
N = number of active sample values per line (720 in the standard for digital TV)
$nz_{actII}$ = number of active lines for the video signal with the second line count (II)
M = conversion factor for the line count conversion (2 for halving of the line count).

The video signal thus produced can now be further processed correspondingly in digital processing apparatus or in a digital television studio. If the video signal is nevertheless to be made available as an analog signal, it still needs to be reconverted into an analog video signal in a D/A converter 21 which likewise is clocked with the new lower clock rate $f_{sII}$. Before further processing, however, it is put through a low-pass filter 22, after which it is made available at the output terminal 23.

In FIG. 2 there is shown in detail one form of embodiment of the line interpolation circuit 8. This consists of at least two delay lines 31, 32 for television lines, the digital video signal supplied at 33 being delayed by the duration of two lines. At the input of the circuit, as well as at each output, are provided respective multiplier stages 34,35,36 to which are respectively supplied individual coefficients (0.25,0.5 and 0.25 respectively) for multiplication with the applied video signal. The output of the multiplying stages 34,35 and 36 are connected with respective inputs of an addition stage 33, at the output 38 of which the line-interpolated video signal is made available.

With this line-interpolation circuit 8, by which in general $2n+1$ lines are interpolated, it is possible to reduce the appearance of alias structures in the low line count picture, as the result of which the vertical resolution can be substantially improved.

Although the invention has been described by reference to particular illustrative example, it will be understood that modifications and variations are possible within the inventive concept.

I claim:
1. Method of converting a video signal of a relatively high line count and having a frame rate and interlace scanning of two fields in each frame into a video signal of lower line count, of about half said relatively high line count, while maintaining the frame rate and the interlace scanning, comprising the steps of:
digitizing the video signal;
storing lines of picture fields in succession line by line with use of a first signal rate for write-in in a regular manner reducing the line count of each field by half;
retrieving stored lines of picture fields with use of a second signal rate for read-out which corresponds to a standard digital TV sampling rate;
said first rate being related, in order to permit reading out at said second signal rate without picture distortion, to the input active line duration and the line count data, as follows:

$$f_{sI} = \frac{N}{\tau_{H\,actI} \cdot \frac{nz_{actII}}{nz_I - nz_{AVI}} \cdot M}$$

wherein:

$f_{sI}$ = video sampling rate used to digitize $\tau_{H\ actI}$ = active line duration of signal digitized $nz_I$ = number of lines of signal digitized $nz_{AVI}$ = number of lines in the vertical blanking blanking interval for the video signal with the higher line count (I)

N = number of active sample values per line determined by the said standard sampling rate $nz_{actII}$ = number of active lines for the video signal with the lower line count N = conversion factor for reducing the number of lines.

2. Method according to claim 1, in which the step of storing lines of picture fields line by line is performed by storing only alternate lines of the first field of each frame alternately into first and second storage units and by storing successive interpolation averages of two successive lines of the lines of the second field of each frame alternately into said first and second storage units.

3. Method as defined in claim 1, in which the step of storing lines of picture fields line by line is performed by storing interpolation-processed lines of the first field of each frame alternately into first and second storage units, said interpolation processed lines being half as many as said relatively high line count and being produced by processing together an odd number of successive lines, and by storing successive interpolation averages of two successive lines of the lines of the second field of each frame alternately into said first and second storage units.

4. Apparatus for converting a video signal of relatively high line count and having a frame rate and interlace scanning of two fields in each frame into a video signal of lower line count, of about half of said relatively high line count, while maintaining said frame rate and interlace scanning comprising:

means for digitizing the video signal of the relatively high line count at a first sample rate ($f_{sI}$);

first and second digital storage units (14, 16);

first switch means for supplying a first field of each frame of video signals digitized by said digitizing means to said first and second storage units (14,16), said first field not necessarily being the first in time sequence of said video signal of relatively high line count;

means for writing, line by line, television lines of said video signals supplied from said first switch means, alternately into said first and second storage units in a regular manner reducing the line count of said first fields by about half;

line interpolation means connected between said digitizing means and said first switch means in a manner suitable for supplying to the output of said first switch means television lines obtained by line interpolation processing of the television lines of the second field of each frame of the signals digitized by said digitizing means, said first switch means being also constituted for supplying said interpolation-processed lines alternately line by line to said first and second storage means under control by said writing means;

means for reading out, at a standard rate of readout, in field by field alternation, the television line contents of said first and second storage units, and means for combining into a single output the signals read out from said first and second storage units, said standard rate of read-out corresponding to a standard digital TV sampling rate; and means for controlling said digitizing means so as to maintain a digital signal sample rate and thereby a sample writing in rate of said writing means in accordance with the following relation:

$$f_{sI} = \frac{N}{\tau_{H\ actI} \cdot \frac{nz_{actII}}{nz_I - nz_{AVI}} \cdot M}$$

wherein:

$f_{sI}$ = video signal sampling rate used to digitize $\tau_{H\ actI}$ = active line duration $nz_I$ = number of lines $nz_{AVI}$ = number of lines in the vertical blanking interval for the video signal with the higher line count (I)

N = number of active sample values per line $nz_{actII}$ = number of active lines for the video signal with the lower line count M = conversion factor for reducing the number of lines.

5. Apparatus according to claim 4, in which said means for combining the signals read out from said first and second storage units is an addition stage, and which the output of said addition stage is connected to a digital-to-analog converter for supplying an analog output video signal.

6. Apparatus according to claim 4, in which second television line interpolation means are provided for interpolation processing of the television lines of said first field of each frame of the signals digitized by said digitizing means and are interposed between said digitizing means and a terminal of said first switching means through which digital signals of said first field of each frame are supplied to said first and second storage units.

7. Apparatus according to claim 4, in which said interpolation means comprises a delay line (11), an addition stage (12) and a multiplication stage (13) connected in such a way that said addition stage (12) adds video signals of an undelayed line with video signals having a delay corresponding to the interval in corresponding portions of successive television lines, and that the multiplication stage is connected so as to multiply the output of the addition stage by a preselected coefficient.

8. Apparatus according to claim 7, in which a second interpolation means is provided between said digitizing means and said first switch means in a manner suitable for supplying to the output of said first switch means television lines obtained by line interpolation processing of the television lines of said first field of the signals digitized by said digitizing means, said second interpolation means comprising at least two delay lines (31,32) connected in cascade, multiplier stages (34,35,36) connected at the input and output of each said delay line for multiplying the signals present there by a predetermined coefficient, and an addition stage connected for adding together the outputs of said multipliers in such a way as to derive an interpolated video signal derived from an odd number of television lines.

* * * * *